Sept. 19, 1950  O. S. JENNINGS  2,523,117
ELECTRICAL PROTECTIVE APPARATUS

Filed March 16, 1949  2 Sheets-Sheet 1

WITNESSES:
H. F. Susser
E. F. Oberheim

INVENTOR
Oliver S. Jennings.
BY
Paul E. Friedemann
ATTORNEY

Sept. 19, 1950   O. S. JENNINGS   2,523,117
ELECTRICAL PROTECTIVE APPARATUS
Filed March 16, 1949   2 Sheets-Sheet 2
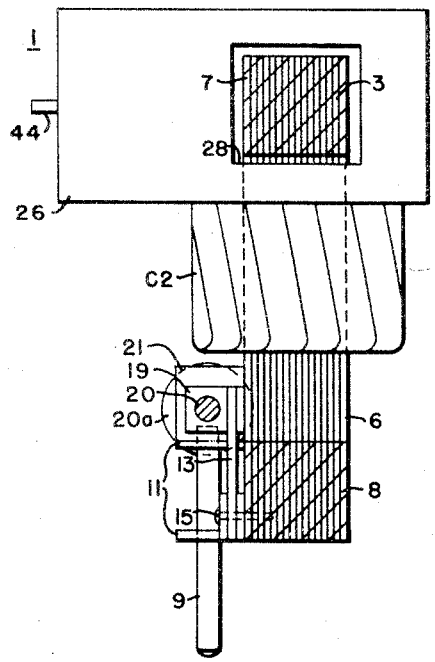
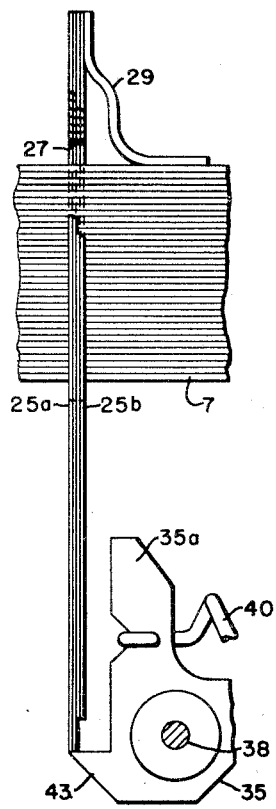
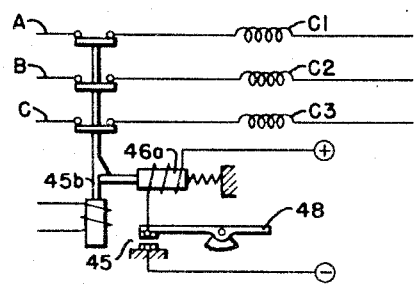
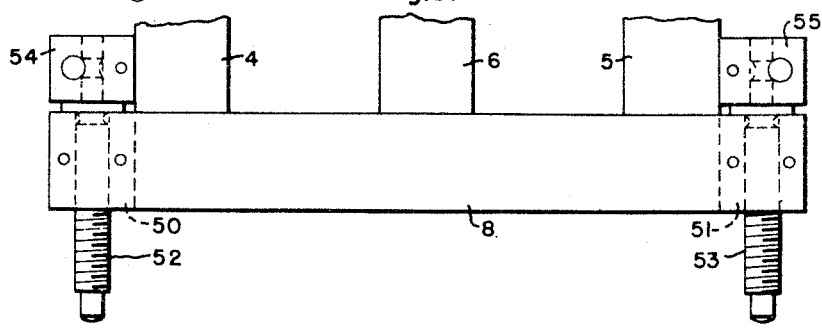
WITNESSES:
N. F. Susser
E. F. Oberhein
INVENTOR
Oliver S. Jennings.
BY
Paul E. Friedemann
ATTORNEY Patented Sept. 19, 1950

2,523,117

UNITED STATES PATENT OFFICE 2,523,117

ELECTRICAL PROTECTIVE APPARATUS

Oliver S. Jennings, Pittsburgh, Pa., assignor to Westinghouse Electric Corporation, East Pittsburgh, Pa., a corporation of Pennsylvania Application March 16, 1949, Serial No. 81,650

4 Claims. (Cl. 175—294)

This invention relates generally to electrical protective devices, and more in particular to a thermal-inductive type overload device.

The overload device of this invention is particularly adaptable in the protection of a three-phase circuit against electrical overload and to this end is provided with three electromagnetic poles, the coils of which are respectively connected in separate phases of the three-phase circuit.

In certain of its aspects, this invention is related to a copending application of the applicant, Serial No. 81,649, filed on the same date as this application, and asigned to the same assignee as this invention One object of this invention is to provide an electrically operated relay or switch which is simple in its elements and positive in operation.

Another object of this invention is to provide an electrically operated relay or switch for use on a three-phase electrical system which affords protection of the system against electrical overload should one or more of the three phases be overloaded.

A further object of this invention is to provide a protective relay in which the rating is easily and conveniently adjusted over a wide range.

Yet a further object of this invention is to provide a three-pole overload relay of the class described in which the rating with respect to each of the three poles is variable simultaneously in the same sense and in the same amount.

A still further object of this invention is to provide a thermal overload device in which damage to the thermal responsive elements during heavy overloads is prevented.

The foregoing statements are merely illustrative of the various aims and objects of this invention. Other objects and advantages will become apparent upon a study of the following specification when considered in conjunction with the accompanying drawings, in which:

Fig. 3 is a fragmentary sectional view taken on the line III—III of Fig. 2;

Fig. 4 is a circuit diagram illustrating the electrical connections of the thermal overload device of this invention;

Fig. 5 is a fragmentary showing of an alternative embodiment of this invention; and Fig. 6 is an enlarged fragmentary view of a bimetal assembly embodied in this invention.

Figure 1:
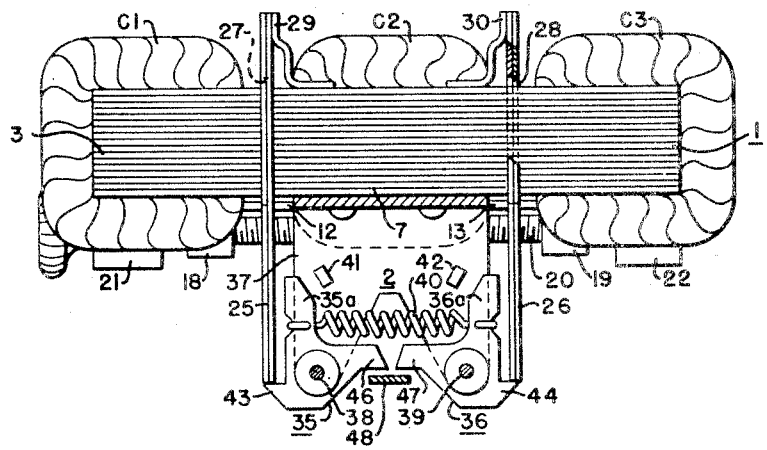
Figure 1 is a top view of a thermal inductive type overload device embodying the principles of this invention.
Figure 2:
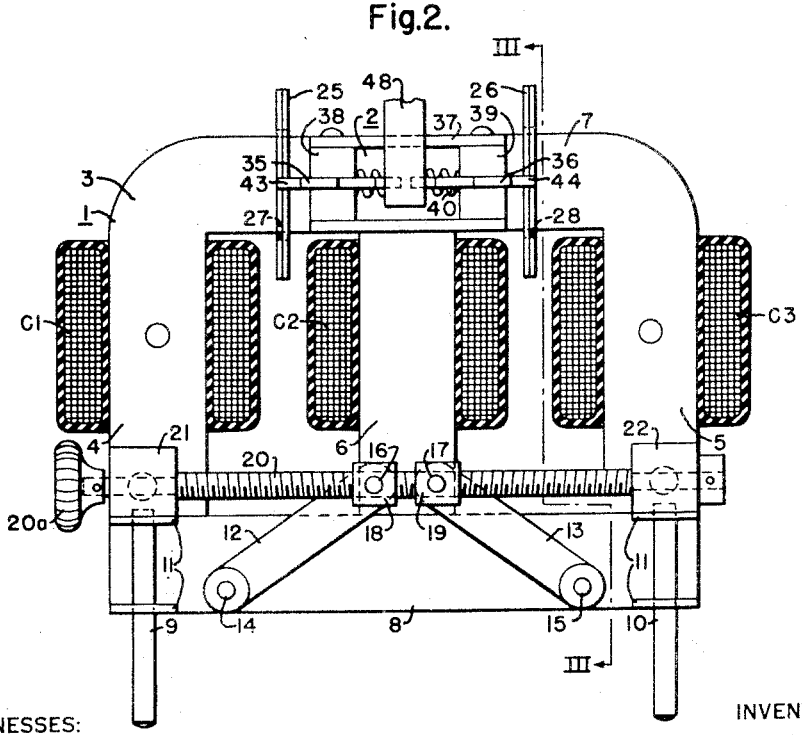
Fig. 2 is a side view of the device of Fig. 1.

The thermal inductive type overload device illustrated in Figures 1, 2 and 3 comprises generally a three-pole electromagnetic unit 1 and a release mechanism 2. The electromagnetic unit includes a generally E-shaped core member 3 which may be solid but which is preferably fabricated of E-shaped laminated punchings forming a core section having a pair of outer legs 4 and 5 and a central leg 6 all jointed by an integrally formed bridging member 7. A movable core or armature section 8 is supported in a position straddling the extremities of the respective legs 4, 5 and 6 forming a flux path of magnetic material therebetween. As illustrated, the free extremities of the respective legs confront the upper side of the movable armature 8.

For the purpose of recalibrating, i. e. changing the rating of the overload device, the movable core or armature section 8 is adjustable along a path toward or away from the free extremities of legs 4, 5 and 6 by means of guide rods 9 and 10 respectively secured to the outer legs 4 and 5 and respectively passing through in sliding engagement therewith, a pair of guides 11 secured at each extremity of the movable armature 8.

The movable armature 8 is adjustably positioned along the guide bars 9 and 10 by means of a link mechanism including a pair of links 12 and 13 each being pivotally secured at one extremity adjacent an extremity of the movable armature 8, the points of pivotal attachment being designated respectively at 14 and 15. The remaining extremities of the two links are respectively pivotally attached at 16 and 17 to traveling nuts 18 and 19, respectively, traveling nuts 18 and 19 being respectively threadedly engaged by the right and left-hand threaded portions of threaded member 20. Threaded member 20 is suitably journaled at its extremities in journal blocks 21 and 22, respectively fastened to the lower extremities of the outer legs 4 and 5, its axis paralleling the longitudinal axis of the movable armature 8. As illustrated, the movable armature 8 is in its uppermost position abutting the confronting faces of the extremities of legs 4, 5 and 6, in which position the traveling nuts 18 and 19 are adjacent the center of the threaded member 20 and occupy positions closer together than the points of pivoting 14 and 15 of the links on the movable armature. The four points of pivoting 14, 15, 16 and 17 thus define an equilateral trapezoid in which the legs are formed by the links and the upper base is defined between the centers of the pivots 16 and 17. Thus it will be appreciated that lengthening of the upper base by rotation of the threaded member 20 by knurled knob 20a angularly displaces links 12 and 13 in opposite directions as the nuts travel away from their center positions illustrated, dropping the movable armature 8 away from the extremities of the legs 4, 5 and 6. With the construction provided, the displacement of the armature is the same at all three legs, forming equal air gaps between the leg extremities and the armature and, hence, providing equal reluctance paths across each air gap. In this construction, it is preferred that all parts of the adjusting mechanism shall be of non-magnetic material so that the air-gap characteristics will not be disturbed by the adjusting mechanism parts.

Each leg 4, 6 and 5 is provided with a coil, respectively designated C1, C2 and C3, each adapted for connection in separate phases of a three-phase electrical network. This is illustrated in Fig. 4 wherein coil C1 is connected in phase A, coil C2 is connected in phase B and coil C3 is connected in phase C. Thus, each phase of the system is represented in a flux produced in the core structure in the overload device. Assuming equal phase currents and identical coils, it will be understood that the equal gap settings afforded by the movable armature provides equal magnetic fluxes from the respective coils in the core structure. The coils are identical, being wound of the same size wire, having the same number of turns and being wound in the same direction. Thus when connected as illustrated the fluxes are in the same phase relation in the respective legs 4, 5 and 6.

In one embodiment of this invention the release mechanism 2 is controlled by a pair of flat bimetallic elements 25 and 26 which are each of the form of flat strips and are provided with rectangular openings 27 and 28, respectively, (see Fig. 3 for opening 28) which surround and enclose the associated portions of bridging core section 7 on opposite sides of the central leg 6. These bimetallic elements extend transversely of the core section as best viewed in Fig. 1 and are supported on one side of the core structure by means of supports 29 and 30 which secure the corresponding extremities of the bimetallic elements to the side of the bridging member 7. The position of each bimetallic element along the bridging core section 7 may be adjusted by bending the supports 29 and 30 respectively to support the bimetallic elements in desired positions with respect to a pair of catch members 35 and 36. If desired other forms of adjusting mechanism may be employed.

The catch members 35 and 36 of the release or tripping mechanism are mounted on the opposite side of the bridging core section 7 from the supports 29 and 30, between the sides of a U-shaped support 37, the base of which is secured to the side of core section 7. Catch members 35 and 36 are respectively pivoted at 38 and 39 between the sides of support 37 and have arms 35a and 36a, respectively, engaged by a tension spring 40 biasing the catch members in opposite rotative directions about the pivots 38 and 39, the degree of angular movement being controlled by stop members 41 and 42 in the path of movement of the arms 35a and 36a respectively.

Rotative movement of each catch member is prevented by projections 43 and 44, respectively, which engage the corresponding extremities of the bimetallic elements and operation of a contact assembly, which may comprise the contact assembly 45 of Fig. 4 is accomplished by the projections 46 and 47 which respectively move clockwise and counterclockwise as viewed in Fig. 1, to engage the bar 48 moving that bar to close contact assembly 45, shown in Fig. 4, in the circuit controlling the electromagnetically operated latch 45a of the line switch 45b. It will be appreciated that either one or both of the catch members will actuate the bar 48.

The bimetallic elements in their position surrounding the section 7 of the core, in effect form single-turn short-circuited windings thereabout in which voltages are induced by the magnetic flux of the core, having currents circulating in the loop circuit about the openings therein. The cross-sectional dimensions of those portions of each bimetallic element forming the sides of the opening therein are such as to cause heating thereof upon the occurrence of a predetermined induced current to produce deflection of the bimetallic element in accordance with the degree of heating. The deflection of each bimetallic element is away from its catch member so that the catch member may be released. The cross-sectional areas are such as to be insufficiently heated by currents resulting from the magnetic flux flowing when none of the three phases of the system are electrically overloaded, but sufficiently heated to deflect and release the catch members upon the occurrence of a magnetic flux due to predetermined overload in one or more of the three phases. However, overheating of the bimetallic elements is obviated since under heavy overload the core structure saturates and damaging currents are not induced in the bimetallic elements.

The function of the bimetallic elements may be improved by placing two or more bimetals in side by side relation. As shown in Fig. 7, which illustrates only one of the bimetal assemblies, each bimetal assembly may comprise two bimetals, as illustrated in the left hand bimetal assembly, 25a and 25b. These pairs of bimetals are securely jointed together only in the region of the respective supports 29 and 30 and are thus free for relative sliding movement along the remainder of their length. Leading bimetal 25a is longer than its comparison bimetal and engages and holds the catch member. The bimetals of each pair move in the same direction when heated and the advantage of this arrangement is that the bimetal force is doubled for tripping making tripping more positive while at the same time the larger deflection for a single thin bimetal is maintained.

It is now clearly evident that changes in the rating of this overload device are expeditiously accomplished by simply turning the knurled knob 20a which results in equal air-gap changes at each of the three poles. Thus, the ampere turns for tripping are changed but the fluxes produced by each coil assuming equal excitation are as formerly. This arrangement affords a wide range in rating adjustments. The copper of each of the coils is computed to carry the currents at maximum rating.

An alternative construction for actuating the movable armature member is fragmentarily illustrated in Fig. 5 in which the movable armature is supported at its respective extremities by separate identical adjusting mechanisms of non-magnetic material. Again this embodiment affords a variable adjustment in which substantial equality among the magnetic reluctances at each pole can be maintained. In detail, each extremity of the armature is fitted with a threaded member. These are identified by reference numerals 50 and 51 respectively, which receive the screws 52 and 53, respectively. The axis of these screws parallels the axes of the poles and their upper extremities as viewed are rotatively journaled against axial movement in supports 54 and 55 respectively secured at the outer sides of the legs 4 and 5. Thus, rotational movement of the screws in like amounts correspondingly displaces both ends of the movable armature, maintaining substantial equality among the three gaps and the reluctances identical. Such a construction is primarily of utility in heavy-duty applications wherein the magnetic forces are high. In general, the strength of the armature controlling mechanism determines the maximum overload capacity. The idea is not limited by the particular form of the armature controlling mechanism. In the event unequal performance is desired the mechanisms may be arranged to give suitable adjustments to obtain the desired unequal performance through the magnetic paths, bimetal performance, or windings. Further variations in performance may be obtained by reversing the polarities of one or more of the coils.

The foregoing disclosure and showings made in the drawings are merely illustrative of the principles of this invention and are not to be interpreted in a limiting sense.

I claim as my invention:

1. In a thermal overload device, the combination of, an E-shaped core member, a coil disposed about each leg of said E-shaped core member, a movable armature member straddling the extremities of the three legs of the E-shaped core member, adjusting means for moving said armature member relative to said E-shaped core member to simultaneously vary the three air gaps between the extremities of said three legs and said armature member in the same sense and in the same amount, a pair of flat bimetallic elements each having an opening therein, means supporting said bimetallic elements on opposite sides of the central leg of said E-shaped core member with said E-shaped core member on opposite sides of said central leg extending through the opening in the corresponding one of said bimetallic elements, release mechanism responsive to deflections of said bimetallic elements, and circuit means for energizing said coils.

2. In a thermal overload device, the combination of, a generally E-shaped core member comprised of three legs including a pair of outer legs and a central leg each jointed at one extremity to an integrally formed bridging member, a movable armature member straddling the free extremities of said three legs, adjusting means for moving said armature member relative to the extremities of said three legs to vary the air gaps formed between the extremities of said three legs and said movable armature member in the same sense and in the same amount, a coil disposed about each leg of said E-shaped core member, said coils being adapted for connection in separate phases of a three-phase electrical system each to be energized in accordance with the respective voltages of said three phases, two flat bimetallic elements each having an opening therein, support means supporting said bimetallic elements on opposite sides of said central leg with said openings surrounding corresponding portions of said bridging member on opposite sides of said central leg, the sides of said openings being in spaced relation with said bridging member, each of said bimetallic elements forming in effect a single-turn short-circuited winding about said central leg, and a release mechanism responsive to deflections of said bimetallic elements.

3. In a thermal overload device, the combination of, a generally E-shaped core member comprised of three legs including a pair of outer legs and a central leg each joined at one extremity to an integrally formed bridging member, a movable armature member straddling the free extremities of said three legs, adjusting means for moving said armature member relative to the extremities of said three legs to vary the air gaps formed between the extremities of said three legs and said movable armature member in the same sense and in the same amount, said adjusting means comprising a pair of links, one extremity of each link being pivotally secured to said armature member, the respective points of pivotal securement being correspondingly spaced from the extremities of said movable armature, a threaded member having right and left-hand threaded portions on opposite sides of the longitudinal center thereof, means journaling the extremities of said threaded member on said pair of outer legs, a pair of traveling nuts respectively on the right and left-hand threaded portions of the threaded member, the remaining extremities of said links being pivotally secured to the respective traveling nuts, said links being normally angularly displaced in opposite directions with respect to the longitudinal axis of said armature member whereby rotation of said threaded member displacing said traveling nuts in opposite directions moves said links to displace both extremities of said movable armature in the same sense and amount, a coil disposed about each leg of said E-shaped core member, the coils being adapted for connection in separate phases of a three-phase electrical system each to be energized in accordance with the respective voltages of said three phases, two flat bimetallic elements each having an opening therein, support means supporting said bimetallic elements on opposite sides of said central leg with said openings surrounding corresponding portions of said bridging member on opposite sides of said central leg, the sides of said openings being in spaced relation with said bridging member, each of said bimetallic elements forming in effect a single-turn short-circuited winding about said central leg, and a release mechanism responsive to deflections of said bimetallic elements.

4. In a thermal overload device, the combination of, a generally E-shaped core member comprised of three legs including a pair of outer legs and a central leg each joined at one extremity to an integrally formed bridging member, a movable armature member straddling the free extremities of said three legs, adjusting means for moving said armature member relative to the extremities of said three legs to vary the air gaps formed between the extremities of said three legs and said movable armature member in the same sense and in the same amount, said adjusting means comprising a pair of threaded members threading through opposite extremities of said armature member and paralleling the path of movement of said movable armature, means journaling said threaded members respectively on said pair of outer poles to provide rotation of each thereof without axial movement corresponding rotation of each threaded member correspondingly moving said armature member with respect to the extremities of said three legs, a coil disposed about each leg of said E-shaped core member, the coils being adapted for connection in separate phases of a three-phase electrical system each to be energized in accordance with the respective voltages of said three phases, two flat bimetallic elements each having an opening therein, support means supporting said bimetallic elements on opposite sides of said central leg with said openings surrounding corresponding portions of said bridging member on opposite sides of said central leg, the sides of said openings being in spaced relation with said bridging member, each of said bimetallic elements forming in effect a single-turn short-circuited winding about said central leg, and a release mechanism responsive to deflections of said bimetallic elements.

OLIVER S. JENNINGS.

REFERENCES CITED

The following references are of record in the file of this patent:

UNITED STATES PATENTS

| Number | Name | Date |
| --- | --- | --- |
| 1,210,705 | Schuchardt | Jan. 2, 1917 |
| 1,982,335 | White | Nov. 27, 1934 |